(12) United States Patent
Katikaneni et al.

(10) Patent No.: US 11,542,159 B2
(45) Date of Patent: Jan. 3, 2023

(54) AUTOTHERMAL REFORMER SYSTEM WITH LIQUID DESULFURIZER FOR SOFC SYSTEM

(71) Applicants: Saudi Arabian Oil Company, Dhahran (SA); Korea Advanced Institute of Science and Technology, Daejeon (KR)

(72) Inventors: Sai P. Katikaneni, Dhahran (SA); Joongmyeon Bae, Daejeon (KR); Jiwoo Oh, Daejeon (KR); Minseok Bae, Daejeon (KR); Dongyeon Kim, Daejeon (KR)

(73) Assignees: Saudi Arabian Oil Company, Dhahran (SA); Korea Advanced Institute of Science and Technology, Daejeon (KR)

( * ) Notice: Subject to any disclaimer, the term of this patent is extended or adjusted under 35 U.S.C. 154(b) by 214 days.

(21) Appl. No.: 16/907,731

(22) Filed: Jun. 22, 2020

(65) Prior Publication Data

US 2021/0395084 A1  Dec. 23, 2021

(51) Int. Cl.
*C01B 3/38* (2006.01)
*C01B 3/40* (2006.01)
*C01B 3/48* (2006.01)
*H01M 8/06* (2016.01)

(52) U.S. Cl.
CPC ............ *C01B 3/382* (2013.01); *C01B 3/40* (2013.01); *C01B 3/48* (2013.01); *H01M 8/06* (2013.01); *C01B 2203/0244* (2013.01); *C01B 2203/066* (2013.01); *C01B 2203/0811* (2013.01); *C01B 2203/107* (2013.01); *C01B 2203/1058* (2013.01); *C01B 2203/127* (2013.01); *C01B 2203/142* (2013.01); *C01B 2203/1604* (2013.01)

(58) Field of Classification Search
CPC .. C01B 3/382; C01B 3/40; C01B 3/48; C01B 2203/0244; C01B 2203/066; C01B 2203/0811; C01B 2203/1058; C01B 2203/107; C01B 2203/127; C01B 2203/142; C01B 2203/1604; C01B 2203/1247; C01B 2203/1258; H01M 8/06; H01M 8/0618
See application file for complete search history.

(56) References Cited

U.S. PATENT DOCUMENTS

| | | | |
|---|---|---|---|
| 2,642,381 A * | 6/1953 | Dickinson | B01J 8/0285 208/240 |
| 6,156,084 A * | 12/2000 | Bonville, Jr. | C10G 29/04 208/244 |
| 6,521,204 B1 | 2/2003 | Borup et al. | |
| 6,635,372 B2 | 10/2003 | Gittleman | |
| 6,994,930 B1 | 2/2006 | Geisbrecht et al. | |
| 7,323,159 B2 | 1/2008 | Ahluwalia et al. | |
| 8,557,189 B2 | 10/2013 | Roychoudhury et al. | |
| 8,563,184 B2 | 10/2013 | Kaupert et al. | |
| 9,199,846 B2 | 12/2015 | Roychoudhury et al. | |
| 9,337,505 B2 | 5/2016 | Roychoudhury et al. | |
| 2002/0007595 A1 | 1/2002 | Maier-Roeltgen et al. | |
| 2004/0194383 A1 | 10/2004 | Wheat et al. | |
| 2009/0165368 A1 | 7/2009 | Liu et al. | |
| 2009/0186246 A1 | 7/2009 | Heo et al. | |
| 2009/0223861 A1 | 9/2009 | Sugiura et al. | |
| 2010/0104897 A1* | 4/2010 | Bae | H01M 8/0618 429/425 |
| 2012/0021307 A1 | 1/2012 | Watanabe et al. | |
| 2016/0293984 A1 | 10/2016 | Kang et al. | |
| 2018/0358639 A1 | 12/2018 | Yajima et al. | |
| 2019/0148744 A1 | 5/2019 | Choi et al. | |

FOREIGN PATENT DOCUMENTS

| | | |
|---|---|---|
| EP | 112613 B1 | 3/1991 |
| EP | 2767506 A1 | 8/2014 |
| EP | 1645540 B1 | 6/2017 |
| JP | 2004031025 A | 1/2004 |
| JP | 2005255896 A | 9/2005 |
| JP | 2006278074 A | 10/2006 |
| JP | 2006351293 A | 12/2006 |
| JP | 4885917 B2 | 6/2010 |

(Continued)

OTHER PUBLICATIONS

Zhang "Homogeneous Combustion Catalysts for Efficiency Improvements and Emission Reduction in Diesel Engines" In: 7th Asia-Pacific Conference on Combustion, National Taiwan University, Taipei, Taiwan May 24-27, 2009 (Year: 2009).*
International Search Report and Written Opinion dated Mar. 19, 2021 pertaining to International application No. PCT/US2020/064833 filed Dec. 14, 2020, 14 pgs.
Office Action dated May 27, 2021 pertaining to U.S. Appl. No. 16/830,649, filed Mar. 26, 2020, 22 pages.
International Search Report and Written Opinion dated Feb. 22, 2021 pertaining to International application No. PCT/US2020/060096 filed Nov. 12, 2020, 15 pgs.

(Continued)

*Primary Examiner* — Steven J Bos
*Assistant Examiner* — Syed T Iqbal
(74) *Attorney, Agent, or Firm* — Dinsmore & Shohl LLP

(57) ABSTRACT

Embodiments of the present disclosure are directed to a diesel reforming system comprising: a diesel autothermal reformer; a liquid desulfurizer disposed upstream of the diesel autothermal reformer and configured to remove sulfur compounds from diesel fuel prior to feeding to the diesel autothermal reformer; a combustor in communication with the liquid desulfurizer and configured to provide heat for the liquid desulfurizer; a regulating valve in communication with the liquid desulfurizer and the combustor, the regulating valve being configured to control diesel fuel feeds to the liquid desulfurizer and the combustor; and a post-reformer disposed downstream of the diesel autothermal reformer.

7 Claims, 1 Drawing Sheet

(56) References Cited

FOREIGN PATENT DOCUMENTS

| | | |
|---|---|---|
| JP | 6182450 B2 | 8/2017 |
| KR | 100718106 B1 | 5/2007 |
| KR | 20090079517 A | 7/2009 |
| KR | 101077929 B1 | 10/2011 |
| KR | 101172841 B1 | 8/2012 |
| KR | 101179539 B1 | 8/2012 |
| KR | 101276677 B1 | 6/2013 |
| WO | 2009057648 A1 | 5/2009 |
| WO | 2016114214 A1 | 7/2016 |

OTHER PUBLICATIONS

Araki S. et al. "Start-up procedures in autothermal reforming of biogas over a Ni based catalytic monolith", Catalysis Communications, Elsevier, Amsterdam, NL, vol. 10, No. 9, Apr. 25, 2009, pp. 1300-1304.

Springmann S. et al. "Cold start simulations of a gasoline based fuel processor for mobile fuel cell applications", Journal of Power Sources, Elsevier SA, CH, vol. 128, No. 1, Mar. 29, 2004, pp. 13-24.

International Search Report and Written Opinion dated Oct. 4, 2021 pertaining to International application No. PCT/US2021/038440 filed Jun. 22, 2021, 13 pages.

Yoon, S. et al. "Development of a self-sustaining kWe-class integrated diesel fuel processing system for solid oxide fuel cells", International Journal of Hydrogen Energy, Elsevier Science Publishers B.V., Barking, GB, vol. 36, No. 16, Oct. 1, 2010, pp. 10302-10310.

U.S. Notice of Allowance and Fee(s) Due dated Sep. 20, 2021 pertaining to U.S. Appl. No. 16/830,649, filed Mar. 26, 2020, 9 pages.

\* cited by examiner

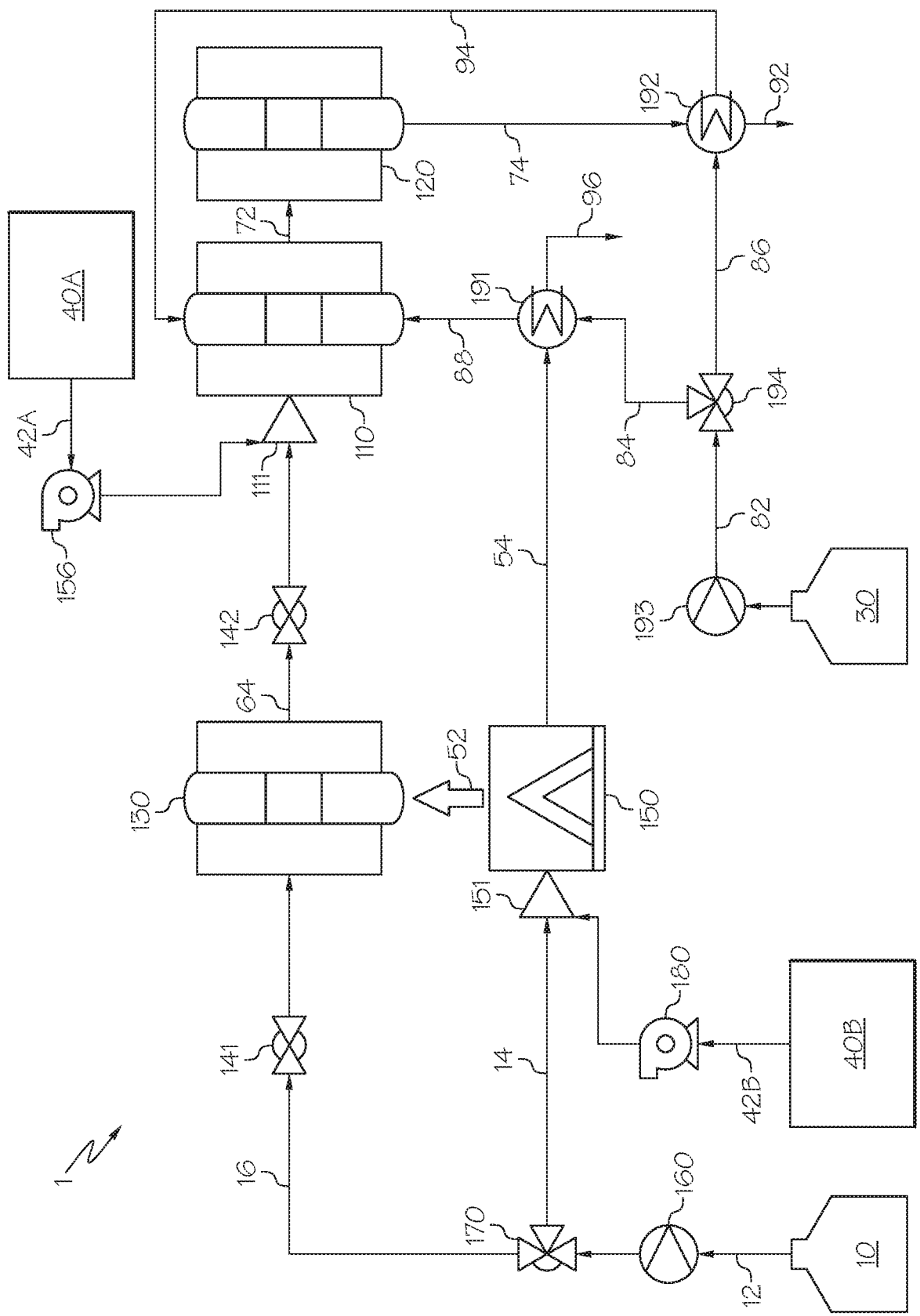

AUTOTHERMAL REFORMER SYSTEM WITH LIQUID DESULFURIZER FOR SOFC SYSTEM

TECHNICAL FIELD

Embodiments of the present disclosure generally relate to diesel reforming systems and specifically relate to diesel reforming systems having liquid desulfurizers.

BACKGROUND

Fuel cells are power generation systems that convert the chemical reaction energy of hydrogen and oxidant contained in hydrocarbon-based materials such as hydrogen, methanol, and ethanol into direct electrical energy. Since a fuel cell uses hydrogen as a fuel, the hydrogen for the fuel cell can be obtained through steam reforming from a hydrocarbon-based fuel such as methane, methanol, natural gas, gasoline and diesel. A fuel reformer can be classified into steam reforming, partial oxidation reforming and autothermal reforming according to a reforming method.

Steam reformers are suitable for fuels with a high hydrogen content in the reformed gas and short carbon chains such as methane and natural gas. In addition, the steam reforming reaction is suitable for a Solid Oxide Fuel Cell (SOFC) system having a high operating temperature, because the reformed gas contains a high temperature. However, the steam reformer consumes a large amount of heat to generate steam, thus heat recovery is complicated and the manufacturing costs of the reactor are increased due to these reasons.

Partial oxidation reforming is the process in which the teed fuel, such as methane or a suitable hydrocarbonaceous fuel, reacts exothermically in the presence of a small amount of air. However, the partial oxidation process cannot be used for gasifying gasoline, diesel, methanol, or ethanol, because of the decrease in energy content of the fuel.

SUMMARY

Diesel has high volumetric hydrogen density and gravimetric density. This makes diesel reforming an attractive option for a Solid Oxide Fuel Cell (SOFC) system. Accordingly, there is a continual need for diesel reformers using diesel fuel, which yields improved system efficiency. Some diesel reforming processes may remove sulfur compounds in diesel fuel downstream of reforming diesel fuel. The operating temperature range of desulfurizing diesel fuel may be lower than the operating temperature range of reforming diesel fuel. Thus, to remove sulfur compounds from diesel fuel, the reformed diesel fuel may be cooled prior to being desulfurized. Also, to use this reformed and desulfurized diesel fuel for a SOFC system, desulfurized diesel fuel may be heated to fit an operating temperature range of a SOFC system.

The presently-described systems and processes of diesel reforming may eliminate these cooling and heating steps. Therefore, the systems and process for reforming diesel fuel may enable efficient and cost effective converting diesel fuel into hydrogen and methane for a Solid Oxide Fuel Cell.

According to one or more embodiments, a diesel reforming system may comprise a diesel autothermal reformer; a liquid desulfurizer disposed upstream of the diesel autothermal reformer and configured to remove sulfur compounds from diesel fuel prior to feeding to the diesel autothermal reformer; a combustor in communication with the liquid desulfurizer and configured to provide heat for the liquid desulfurizer; a regulating valve in communication with the liquid desulfurizer and the combustor, the regulating valve being configured to control diesel fuel feeds to the liquid desulfurizer and the combustor; and a post-reformer disposed downstream of the diesel autothermal reformer.

According to one or more embodiments, a method of diesel reforming may comprise introducing a first diesel fuel feed to a combustor, wherein the combustor generates heat from combustion of the first diesel fuel feed; passing the heat to a liquid desulfurizer wherein the heat raises the temperature of the liquid desulfurizer to operating temperature; introducing a second diesel fuel feed to the liquid desulfurizer, wherein the liquid desulfurizer at operating temperature removes sulfur compounds to produce desulfurized diesel fuel; introducing the desulfurized diesel fuel, as well as air and steam to a diesel autothermal reformer to at least partially convert the desulfurized diesel fuel to a diesel reformate; and introducing the diesel reformate to a post-reformer disposed downstream of the diesel autothermal reformer, wherein the post-reformer selectively decomposes low carbon ($C_2$-$C_5$) hydrocarbons in the diesel reformate into hydrogen and methane.

Additional features and advantages of the described embodiments will be set forth in the detailed description which follows, and in part will be readily apparent to those skilled in the art from that description or recognized by practicing the described embodiments, including the detailed description which follows and the claims.

BRIEF DESCRIPTION OF THE DRAWINGS

The following detailed description of specific embodiments of the present disclosure can be best understood when read in conjunction with the following drawing in which:

FIG. 1 is a schematic illustration of a diesel reforming system according to one or more embodiments of the present disclosure.

Reference will now be made in greater detail to various embodiments, some embodiments of which are illustrated in the accompanying drawing.

DETAILED DESCRIPTION

Embodiments of the present disclosure are directed to a diesel reformer system and a method of diesel reforming. Referring to FIG. 1, an embodiment of a diesel reforming system 100 is shown. The diesel reforming system 100 comprises a diesel autothermal reformer 110, a liquid desulfurizer 130 disposed upstream of the diesel autothermal reformer 110.

In operation, the diesel reforming system 1 may conduct the following diesel reforming method as shown in FIG. 1. As shown in FIG. 1, the method of diesel reforming may include introducing a first diesel fuel feed 14 to a combustor 150, wherein the combustor 150 generates heat 52 from combustion of the first diesel fuel feed 14. The heat delivered to the liquid desulfurizer 130 raises the temperature of the liquid desulfurizer 130 to operating temperature. A second diesel fuel feed 16 is then fed to the liquid desulfurizer 130. At the operating temperature, the liquid desulfurizer 130 removes sulfur compounds to produce desulfurized diesel fuel 64. Referring again to FIG. 1, the desulfurized diesel fuel 64 as well as air feed 42A and steam 88 are passed to a diesel autothermal reformer 110 wherein the desulfurized diesel fuel 64 is at least partially converted to a diesel reformate 72. Next, the diesel reformate 72 is passed to a post-reformer 120 disposed downstream of the diesel autothermal reformer 110, wherein the post-reformer 120 selectively decomposes low carbon ($C_2$-$C_5$) hydrocarbons in the diesel reformate into hydrogen and methane.

Referring again to FIG. 1, the diesel reforming system 1 may include a diesel fuel tank 10 which contains the diesel fuel 12 used in the diesel reforming system 1. The diesel fuel 12 may be pumped from the diesel fuel tank 10 using pump 160. In the embodiment of FIG. 1, the diesel fuel 12 may be fed to a regulating valve 170, which splits the diesel fuel 12 into the first diesel fuel feed 14 that is fed to the combustor 150 and the second diesel fuel feed 16 that is fed to the liquid desulfurizer 130. The regulating valve 170, which may be a three way valve as depicted in the embodiment of FIG. 1, regulates the amount of diesel fuel supplied to the liquid desulfurizer 130 and the amount of diesel fuel supplied to the combustor 150, which enables the regulating valve 170 to supply diesel fuel to the combustor 150 while also heating up the liquid desulfurizer 130. Various algorithms and control methodologies are contemplated for use with the regulating valve 170 that controls the ratio of the first and second diesel fuel feeds supplied to the combustor 150 and the liquid desulfurizer 130, respectively.

Moreover, the diesel reforming system 1 also includes an air source 40B for the combustor 150. An air feed 42B from the air source may be delivered by a blower 180 to the combustor 150. In one embodiment, the combustor 150 may include an atomizer nozzle 151 at the inlet of the combustor 150. As shown, the first diesel fuel feed 14 and air feed 42B is delivered to the atomizer nozzle 151, and then the atomized diesel fuel and air are injected into the combustor 150 through the atomizer nozzle 151. The amount of diesel fuel supplied in the first diesel fuel feed 14 to the combustor 150 may vary depending on the operation of the diesel autothermal reformer 110. In one embodiment, all of the first diesel fuel feed 14 supplied to the combustor 150 may be completely burned at the time of startup so that the temperature of the liquid desulfurizer 130 rapidly increases. The first diesel fuel feed 14 may have a lesser volume compared to the second diesel fuel feed 16, because a lesser amount of diesel fuel is required for the combustor 150, since the liquid desulfurizer 130 may be heated with the small amount of diesel in a steady state.

Various structural embodiments are contemplated for the combustor 150. In one embodiment, the combustor 150 is a diesel combustor comprising a diesel combustion catalyst. Various diesel combustion catalysts would be considered suitable and familiar to the skilled person, for example, metallic or organometallic catalysts comprising one or more of iron, ceria, or platinum.

The combustor 150 may have an operating temperature range of from 650° C. to 850° C., or from 650° C. to 800° C., or from 650° C. to 750° C., or from 650° C. to 700° C., or from 700° C. to 850° C., or from 700° C. to 800° C., or from 700° C. to 750° C., or from 750° C. to 850° C., or from 750° C. to 800° C., or from 800° C. to 850° C. The combustor 150 may be operated in these temperature ranges to prevent damage to the combustion catalyst. In one embodiment, these operating temperature ranges of the combustor 150 may be controlled by supplying the additional air.

As stated previously, the liquid desulfurizer 130 removes the sulfur components contained in the second diesel fuel feed 16. Various structures are contemplated for the liquid desulfurizer 130. For example, the liquid desulfurizer 130 may be formed of a porous support (including a support having through-pores along a fluid conveying direction) through which the fluid is passed and which impregnates a desulfurizing catalyst. Various catalysts are considered suitable for the desulfurizing catalyst. In one or more embodiments, the desulfurizing catalysts for the liquid desulfurizer 130 may include multi-component catalysts such as cobalt/molybdenum (CoMo) or nickel/molybdenum (NiMo). As the liquid desulfurizer 130 is upstream of the diesel autothermal reformer 110, the catalysts are different than the catalysts typically used in a downstream desulfurizer, which may often use zinc oxide (ZnO). While the present embodiments do not depict a downstream desulfurizer, it is contemplated that a further downstream desulfurizer could be included.

From an operating standpoint, the liquid desulfurizer 130 may have an operating temperature range of 200° C. to 400° C., or from 250° C. to 400° C., or from 300° C. to 400° C., or from 200° C. to 350° C., or from 250° C. to 350° C. The temperature of the liquid desulfurizer 130 may be increased and maintained by the heat 52 generated by the combustor 150.

The pressure of the liquid desulfurizer 130 may be a pressure of 5 bars or more. The pressure of the liquid desulfurizer 130 may be a pressure of from 5 bars to 100 bars, or from 5 bars to 95 bars, or from 5 bars to 90 bars, or from 10 bars to 100 bars, or from 10 bars to 95 bars, or 10 bars to 90 bars.

Referring again to FIG. 1, the pressure may be maintained by one or more valves 141, 142 proximate the liquid desulfurizer 130. The present embodiments may include a front valve 141 positioned upstream of the liquid desulfurizer 130 and a rear valve 142 positioned downstream of the liquid desulfurizer 130. The front valve 141 controls the injection of the second diesel fuel feed 16 into the pressure while the rear valve 142 is closed to build up the requisite pressure in the liquid desulfurizer 130. Subsequently, the desulfurized diesel fuel 64 is discharged at a pressure while the rear valve is at least partially opened. In one embodiment, the pressure of the desulfurized diesel fuel 64 may act on an atomizer nozzle 111 disposed upstream of the diesel autothermal reformer 110 to help atomize the diesel fuel.

Referring again to FIG. 1, the diesel autothermal reformer 110 includes an air feed 42A and at least one steam feed 88. The air feed 42A is delivered by air blower 156, which is in communication with the air source 40A. The steam feeds are produced from water source 30, which may be a water reservoir, water tank, or the like. Water 82 is pulled via pump 193 from the water source 30 and may then pass to distributing valve 194. As shown, the distributing valve 194, which may be a three way valve as shown in the embodiment of FIG. 1, may direct a first water feed 84 to a first heat exchanger 191, wherein the first water feed 84 is converted into a first steam feed 88 via heat exchange with combustion product 54, a high temperature gas discharged from the combustor 150. The high-temperature gas discharged from the first heat exchanger 191 may be expelled to the atmosphere as a vent stream 96. Moreover, the distributing valve 194 may also direct a second water feed 86 to a second heat exchanger 192, wherein the second water feed 86 is converted into a second steam feed 88 via heat exchange with post-reformer product 74, a high-temperature gas discharged from the post-reformer 120. The high temperature reformed gas stream 92 discharged from the second heat exchanger 192 may be injected into a Solid Oxide Fuel Cell stack (not shown).

While various heat exchanger types are contemplated, the first heat exchanger 191 and second heat exchanger 192 are shell and tube heat exchangers in the present embodiment. The amount of steam supplied to the diesel autothermal reformer 110 through the first heat exchanger 191 and the amount of steam supplied to the diesel autothermal reformer 110 through the second heat exchanger 192 may vary depending on operating conditions of the system. Like the regulating valve 170 discussed previously, various algorithms and control methodologies are contemplated for use with the distributing valve 194 that controls the ratio of the first steam feed 88 and second steam feed 94 supplied to the diesel autothermal reformer 110.

From an operational standpoint, the diesel autothermal reformer 110 performs a reforming reaction that converts the desulfurized diesel fuel 64 to produce a diesel reformate 72, a hydrogen-rich fuel. The diesel reformate 72 comprises syngas (i.e., hydrogen and carbon monoxide). The reforming reactions conducted by the diesel autothermal reformer 110 are as follows:

$C_nH_m + aO_2 + bH_2O \rightarrow cH_2 + dCO + eCO_2 + fH_2O$ (each n, m, a, b, c, d, e, and f could be a rational number and controlled by changing the reaction conditions)

As stated previously, an atomizer nozzle 111 is disposed proximate the inlet of the diesel autothermal reformer 110. The desulfurized diesel fuel 64 and air feed 42A are introduced into the diesel autothermal reformer 110 through the atomizer nozzle 111, and the diesel fuel is consequently atomized. Moreover, the desulfurized diesel fuel 64 flows into the atomizer nozzle 111 with sufficient pressure for easier atomization.

The diesel autothermal reformer 110 utilizes high pressure and high temperature operating conditions. For example, the diesel autothermal reformer 110 may have an operating temperature of at least 700° C., or from 750 to 1100° C., or from 750 to 850° C. Moreover, the diesel autothermal reformer 110 may have an operating pressure of at least 0.5 bar, or from 0.5 to 1.5 bars, or from 1.0 to 1.5 bars, or about 1 bar at atmospheric condition.

Various structural embodiments are contemplated for the diesel autothermal reformer 110. The internal and external partition walls of the diesel autothermal reformer 110 may be formed of any material having high durability at a high temperature (about 800° C.) and an excellent heat transfer efficiency. For example, the internal and external partition walls can be substantially formed of stainless steel. In another embodiment, the diesel autothermal reformer comprises a porous support (including a support having through-pores along a fluid conveying direction) through which the fluid is passed and which impregnates the catalyst. In one or more embodiments, the catalyst comprises a noble metal catalyst. Various catalysts suitable for performing the autothermal reforming reactions among the supplied diesel fuel, water and air are contemplated herein. The noble metal catalyst may include Pt, Rh, Ru and a mixture thereof. The catalysts may be supported or unsupported. In supported catalyst embodiments, the catalyst support may comprise alumina, silica, ceria, or combinations thereof. While various amounts of noble metal catalyst are considered suitable, the amount of the noble metal catalyst may be controlled according to a kind of hydrocarbon-based fuel to be reformed, an amount of the supplied fuel and the like.

Referring again to FIG. 1, the diesel reformate 72 is introduced to a post-reformer 120 disposed downstream of the diesel autothermal reformer 110. Here, the post-reformer 120 selectively decomposes low carbon ($C_2$-$C_5$) hydrocarbons in the diesel reformate 72 into a post-reformer product 74 comprising hydrogen and methane. In detail, by the post-reforming catalyst, the low carbon hydrocarbon material ($C_2$-$C_5$) in the diesel reformate 72 is reacted with hydrogen and vapor contained in the diesel reformate 72 to be selectively decomposed into hydrogen and methane.

The inlet of the post-reformer 120 utilizes high temperature and high pressure operating conditions. For example, the inlet of the post-reformer 120 may have an operating temperature range of from 650° C. to 850° C., or from 650° C. to 800° C., or from 700° C. to 850° C., or from 700° C. to 800° C., or about 750° C. Moreover, the inlet of the post-reformer 120 may have an operating pressure of at least 0.5 bar, or from 0.5 to 1.5 bars, or from 1.0 to 1.5 bars, or about 1 bar at atmospheric condition.

The outlet of the post-reformer 120 utilizes high temperature and high pressure operating conditions. For example, the outlet of the post-reformer 120 may have an operating temperature range of from 450° C. to 800° C., or from 450° C. to 750° C., or from 450° C. to 700° C., or from 450° C. to 650° C., or from 450° C. to 600° C., or from 500° C. to 800° C., or from 500° C. to 750° C., or from 500° C. to 700° C., or from 500° C. to 650° C., or from 500° C. to 600° C., or from 550° C. to 800° C., or from 550° C. to 750° C., or from 550° C. to 700° C., or from 550° C. to 650° C., or from 550° C. to 600° C. Moreover, the outlet of the post-reformer 120 may have an operating pressure of at least 0.5 bar, or from 0.5 to 1.5 bars, or from 1.0 to 1.5 bars, or about 1 bar at atmospheric condition.

The post-reformer product 74, which is a high temperature reformed gas discharged from the post-reformer 120 is used as a heat source for the second heat exchanger 192, and the discharged product of the second heat exchanger 192 may then be supplied to the solid oxide fuel cell stack (not shown).

In one or more embodiments, the post-reformer 120 comprises a post-reforming catalyst formed of a transition metal, a noble metal, or a mixture thereof. In one or more embodiments, the transition metal of the post-reforming catalyst includes Ni, Mg and a mixture thereof, and the noble metal thereof includes Pt, Rh, Pd, Ru and a mixture thereof. Like the diesel autothermal reforming catalysts, the post-reforming catalysts may be supported or unsupported. In supported catalyst embodiments, the catalyst support may comprise alumina, silica, ceria, or combinations thereof. Like the diesel autothermal reformer 110, the post-reformer 120 can be formed of a porous support (including a support having through-pores along a fluid conveying direction) through which the fluid is passed and which impregnates the post-reforming catalyst.

The system and method of diesel reforming of the present disclosure may heat diesel fuel prior to reforming diesel fuel. The system and method of diesel reforming may not require additional heating, cooling diesel fuel, or both. Therefore, the systems and process for reforming diesel fuel may enable efficient and cost effective converting diesel fuel into hydrogen and methane for a SOFC.

EXAMPLES

The following examples illustrate one or more additional features of the present disclosure. It should be understood that these examples are not intended to limit the scope of the disclosure or the appended claims in any manner.

Example 1

Example 1 was conducted at a pilot plant having the configuration and characteristics of the system 1 illustrated in FIG. 1. In Example 1, diesel fuel, which qualifies for the fuel quality standards set by Ministry of Environment of South Korea, was introduced to the liquid desulfurizer at the flow rate of 8.4 mL/min. At the liquid desulfurizer, the temperature of diesel fuel was changed from 25° C. (the inlet of the liquid desulfurizer) to 250° C. (the outlet of the liquid desulfurizer) in liquid state. To heat up the diesel fuel, 90 W energy was required for 1 kW electric generation (9% energy loss) in the SOFC. The liquid desulfurizer removed sulfur compounds (from 10 ppm (the inlet of the liquid desulfurizer) to 10 ppb (the outlet of the liquid desulfurizer)) from the diesel fuel to produce desulfurized diesel fuel. The content of sulfur compounds was measured by using a gas detecting tube manufactured by Gastec Co., Ltd. The desulfurized diesel fuel was introduced to the diesel autothermal reformer with air and steam to convert desulfurized diesel fuel to a diesel reformate. The temperature of desulfurized diesel fuel was changed from 850° C. (the inlet of the diesel autothermal reformer) to 780° C. (the outlet of the diesel autothermal reformer). The content of sulfur compounds of the diesel reformate was less than 10 ppb at the outlet of the diesel autothermal reformer. The diesel reformate was sent out of the diesel autothermal reformer and introduced to the post-reformer. The post-reformer decomposed $C_2$-$C_5$ hydrocarbons in the diesel reformate into hydrogen, carbon monoxide, carbon dioxide, and methane, as shown in Table 1. The temperature of the diesel reformate was changed from 780° C. (the inlet of the post-reformer) to 670° C. (the outlet of the post-reformer). Without any cooling or heating process, hydrogen and methane was directly introduced into SOFC system.

TABLE 1

| Compositions (Wt. %) - $H_2O$, $N_2$ free | Diesel reformate |
| --- | --- |
| Hydrogen | 59.4 wt. % |
| Carbon monoxide | 12.1 wt. % |
| Carbon dioxide | 28.4 wt. % |
| Methane | Trace (<0.1 wt. %) |

Comparative Example 2

Comparative Example 2 was conducted at a pilot plant having the autothermal reformer, a post-reformer disposed downstream of the autothermal reformer, and the desulfurizer disposed downstream of the post-reformer. The autothermal reformer, post-reformer, and desulfurizer were incorporated into a single reactor unit. In Comparative Example 2, diesel fuel, which qualifies for the fuel quality standards set by Ministry of Environment of South Korea, was introduced to the autothermal reformer with air and steam to convert the diesel fuel to a diesel reformate. The flow rate was measured at the inlet of the autothermal reformer. The temperature of diesel fuel was changed from 850° C. (the inlet of the autothermal reformer) to 780° C. (the outlet of the autothermal reformer). In Comparative Example 2, compositions of each stream are shown in Table 2. The diesel reformate was introduced to the post-reformer to produce the post diesel reformate. The temperature of diesel reformate was changed from 780° C. (the inlet of the post-reformer) to 670° C. (the outlet of the post-reformer). The post diesel reformate was sent out of the post-reformer and cooled down by water (from 670° C. to 450° C.). To cool down the post diesel reformate, 274 W energy was required for 1 kW electric generation (27.4% energy loss) in SOFC. The cooled post diesel reformate was introduced to the desulfurizer to remove sulfur compounds (from 10 ppm to less than 10 ppb) from the cooled post diesel reformate. The temperature of cooled post diesel reformate was changed from 450° C. (the inlet of the desulfurizer) to 300° C. (the outlet of the desulfurizer). After removing sulfur compounds, the desulfurized post diesel reformate was heated to fit an operating temperature range (500-700° C.) of the SOFC system and introduced into the SOFC system.

TABLE 2

| | Streams | | | | |
| --- | --- | --- | --- | --- | --- |
| Compositions (Wt. %) - $H_2O$, $N_2$ free | Diesel fuel | Diesel reformate | Post diesel reformate | Cooled post diesel reformate | Desulfurized post diesel reformate |
| Sulfur compounds | 10 ppm | 10 ppm | 10 ppm | 10 ppm | <10 ppb |
| Hydrogen | — | 58.2 | 59.4% | 59.4% | 59.4% |
| Carbon monoxide | — | 15.5% | 12.1% | 12.1% | 12.1% |
| Carbon dioxide | — | 26.2% | 28.4% | 28.4% | 28.4% |
| Methane | — | Trace (<0.1%) | Trace (<0.1%) | Trace (<0.1%) | Trace (<0.1%) |

Comparison of Example 1 and Comparative Example 2

Comparing the process of Example 1 to the process of Comparative Example 2, the process of Example 1, which utilizes a liquid desulfurizer and avoids post-reformate cooling and heating steps, enables more efficient conversion of diesel fuel into hydrogen and methane (9% energy loss for Example 1 vs 27.4% energy loss for Comparative Example 2). Moreover, in Example 1, without any cooling or heating process, hydrogen and methane was directly introduced into SOFC system because the temperature of hydrogen and methane at the outlet of the post-reformer (670° C.) fit an operating temperature range (500-700° C.) of the SOFC system. In contrast, in Comparative Example 2, prior to introducing into the desulfurizer, the post diesel reformate was cooled down by water. In addition, prior to introducing into the SOFC system, the desulfurized post diesel reformate was heated to fit an operating temperature range (500-700° C.) of the SOFC system.

A first aspect of the present disclosure is directed to a diesel reforming system comprising a diesel autothermal reformer; a liquid desulfurizer disposed upstream of the diesel autothermal reformer and configured to remove sulfur compounds from diesel fuel prior to feeding to the diesel autothermal reformer; a combustor in communication with the liquid desulfurizer and configured to provide heat for the liquid desulfurizer; a regulating valve in communication with the liquid desulfurizer and the combustor, the regulating valve being configured to control diesel fuel feeds to the liquid desulfurizer and the combustor; and a post-reformer disposed downstream of the diesel autothermal reformer.

A second aspect of the present disclosure may include the first aspect, wherein the combustor is a diesel combustor comprising a diesel combustion catalyst.

A third aspect of the present disclosure may include either of the first or second aspects, further comprising a first heat exchanger in fluid communication with the combustor, the first heat exchanger being configured to convert water into steam with high temperature gas discharged from the combustor.

A fourth aspect of the present disclosure may include any of the first through third aspects, further comprising a second heat exchanger in fluid communication with the combustor, the second heat exchanger being configured to convert water into steam using high temperature reformed gas discharged from the diesel autothermal reformer.

A fifth aspect of the present disclosure may include any of the first through fourth aspects, further comprising a distributing valve for distributing and supplying water to a first heat exchanger and a second heat exchanger.

A sixth aspect of the present disclosure may include the fifth aspect, wherein the post-reformer is disposed downstream of the diesel autothermal reformer.

A seventh aspect of the present disclosure may include any of the first through sixth aspects, wherein the post-reformer comprises a noble metal catalyst, a transition metal catalyst, or combinations thereof.

An eighth aspect of the present disclosure may include any of the first through seventh aspects, wherein the diesel autothermal reformer comprises a noble metal catalyst.

A ninth aspect of the present disclosure is directed to a method of diesel reforming comprising introducing a first diesel fuel feed to a combustor, wherein the combustor generates heat from combustion of the first diesel fuel feed; passing the heat to a liquid desulfurizer wherein the heat raises the temperature of the liquid desulfurizer to operating temperature; introducing a second diesel fuel feed to the liquid desulfurizer, wherein the liquid desulfurizer at operating temperature removes sulfur compounds to produce desulfurized diesel fuel; introducing the desulfurized diesel fuel, as well as air and steam to a diesel autothermal reformer to at least partially convert the desulfurized diesel fuel to a diesel reformate; and introducing the diesel reformate to a post-reformer disposed downstream of the diesel autothermal reformer, wherein the post-reformer selectively decomposes low carbon ($C_2$-$C_5$) hydrocarbons in the diesel reformate into hydrogen and methane.

A tenth aspect of the present disclosure may include the ninth aspect, further comprising controlling diesel fuel feeds to the liquid desulfurizer and the combustor with a regulating valve.

An eleventh aspect of the present disclosure may include either of the ninth or tenth aspects, wherein the diesel reformate comprises syngas.

A twelfth aspect of the present disclosure may include any of the ninth through eleventh aspects, wherein the diesel autothermal reformer comprises a noble metal catalyst.

A thirteenth aspect of the present disclosure may include any of the ninth through twelfth aspects, wherein the post-reformer comprises a noble metal catalyst, a transition metal catalyst, or combinations thereof.

A fourteenth aspect of the present disclosure may include any of the ninth through thirteenth aspects, further comprising converting water into the steam with high temperature gas discharged from the combustor.

A fifteenth aspect of the present disclosure may include any of the ninth through fourteenth aspects, further comprising converting water into the steam with high temperature reformed gas discharged from the post-reformer.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims their equivalents.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in one or more embodiments, a mixture of isomers of that constituent. It should be appreciated that the examples supply compositional ranges for various compositions, and that the total amount of isomers of a particular chemical composition can constitute a range.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

What is claimed is:

1. A method of diesel reforming comprising:
   introducing a first diesel fuel feed to a combustor, wherein the combustor generates heat from combustion of the first diesel fuel feed;
   passing the heat to a liquid desulfurizer wherein the heat raises the temperature of the liquid desulfurizer to operating temperature;
   introducing a second diesel fuel feed to the liquid desulfurizer, wherein the liquid desulfurizer at operating temperature removes sulfur compounds to produce desulfurized diesel fuel;
   introducing the desulfurized diesel fuel, as well as air and steam to a diesel autothermal reformer to at least partially convert the desulfurized diesel fuel to a diesel reformate; and introducing the diesel reformate to a post-reformer disposed downstream of the diesel autothermal reformer, wherein the post-reformer selectively decomposes low carbon ($C_2$-$C_5$) hydrocarbons in the diesel reformate into hydrogen and methane.

2. The method of claim 1, further comprising controlling diesel fuel feeds to the liquid desulfurizer and the combustor with a regulating valve.

3. The method of claim 1, wherein the diesel reformate comprises syngas.

4. The method of claim 1, wherein the diesel autothermal reformer comprises a noble metal catalyst.

5. The method of claim 1, wherein the post-reformer comprises a noble metal catalyst, a transition metal catalyst, or combinations thereof.

6. The method of claim 1, further comprising converting water into the steam with high temperature gas having a temperature of 650° C. and 850° C. discharged from the combustor.

7. The method of claim 1, further comprising converting water into the steam with high temperature reformed gas having a temperature of at least 700° C. discharged from the post-reformer.

* * * * *